Feb. 23, 1954     E. S. BLOXSOM     2,670,130

AIR BRAKE SYSTEM COMPRESSOR

Filed Sept. 8, 1950

Inventor

Eugene S Bloxsom

By Ralph Hammar

Attorney —

Patented Feb. 23, 1954

2,670,130

UNITED STATES PATENT OFFICE 2,670,130

AIR BRAKE SYSTEM COMPRESSOR

Eugene S. Bloxsom, Bridgeport, Conn., assignor to Preventive Maintenance Company, Bridgeport, Conn., a corporation of Connecticut Application September 8, 1950, Serial No. 183,867

3 Claims. (Cl. 230—24)

This invention is intended to decrease the maintenance on automotive air brake systems and the like by automatic injection of liquid or vapor solvent to remove sludge or gum from the valves and other parts of the system. The solvent reservoir is part of the air pressure supply system so that when empty it has no effect on the operation. Further objects and advantages appear in the specification and claims.

Figure 1:
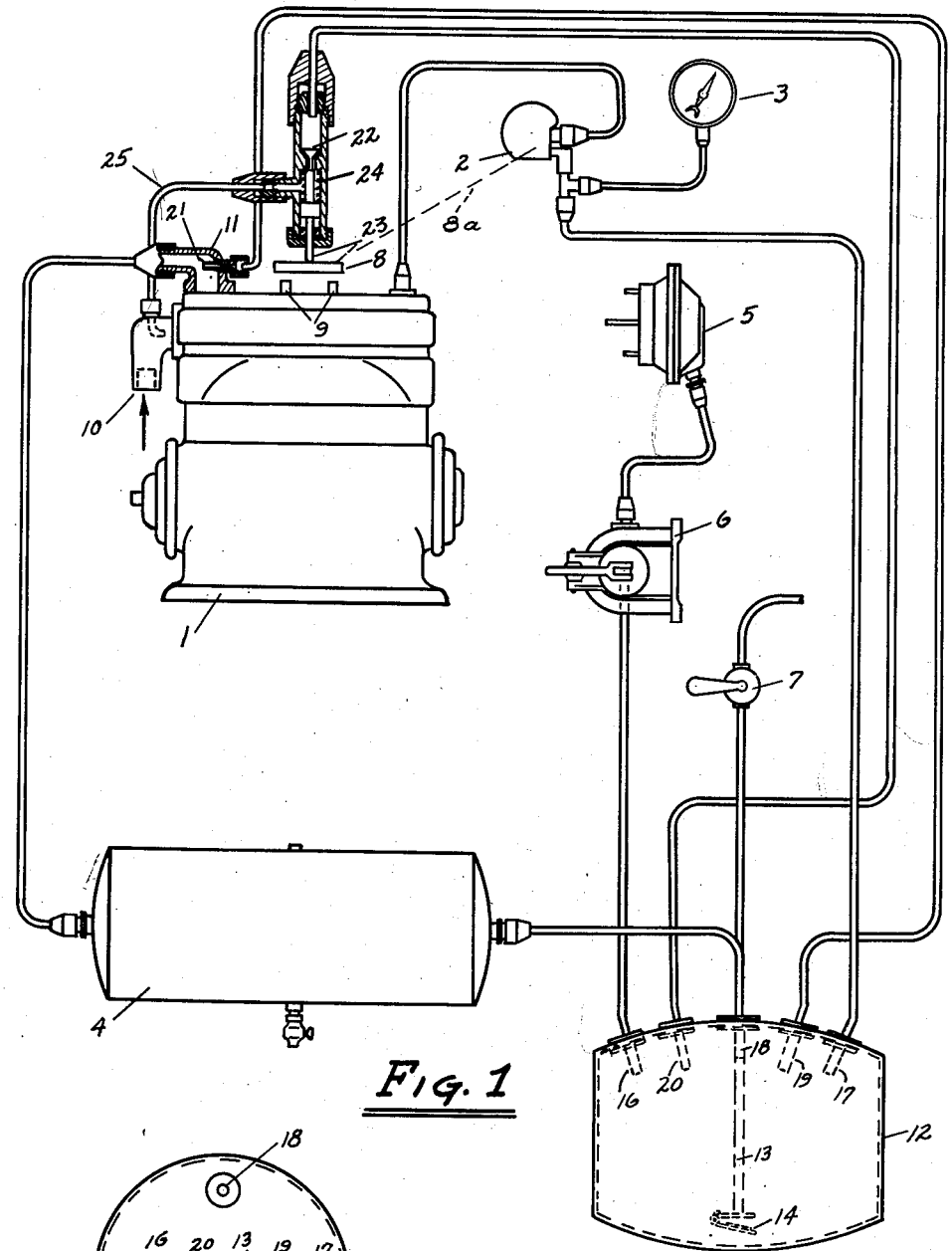
Figure 2:
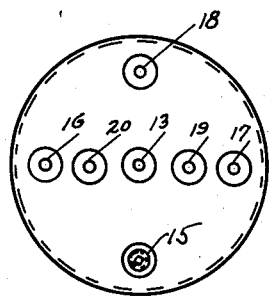

In the drawing Fig. 1 is a diagram of an air brake system such as used on buses, and Fig. 2 is a top view of the solvent reservoir.

The air brake system comprises an air compressor 1 having its pressure controlled by a governor 2 and indicated by a pressure gauge 3; one or more air reservoirs or tanks 4; a brake cylinder 5 controlled by a brake valve 6; and a door cylinder (not shown) controlled by a door valve 7. The parts so far described are typical of air brake systems used in passenger buses. The governor 2 controls an unloader lever 8 by an operating connection indicated by dotted line 8a causing it to move down against unloader valve stems 9 when the air pressure reaches the set value. When the unloader valves 9 are depressed, the air compressor is inactive. When the unloader lever 8 is in the position illustrated, the air is drawn in through an intake fitting 10 and is discharged through a discharge fitting 11. Upon each operation of the valve 6 or 7 air is fed to the respective cylinders controlled by the valves. These parts are, or may be, of common construction.

In the use of the air brake system, there is an accumulation of sludge, gum, or carbon in and around the operating parts of the valves, the compressor, and other moving parts of the brake system. The gum or sludge formation makes the valves and other moving parts harder to operate and increases the wear. In the case of the brake cylinders, the sludge tends to cause uneven brake pressures. All of these result in more frequent replacement and inspection requirements.

In the present system, the compressed air from the reservoir or tank 4 is fed through a tank 12 containing a sludge or gum solvent and valve lubricant. Such a solvent is available on the market under the trade-mark "Safety Sol." Air from the reservoir 4 is fed through the tank 12 through a stand pipe 13 having its lower end adjacent to the bottom of the tank and closed by a check valve 14 which prevents reverse flow of solvent from the tank 12 back to the compressed air reservoir when the compressed air reservoir is drained. The top of the solvent tank 12 is provided with a filler plug 15 and with five or more stand pipes 16, 17, 18, 19, 20 leading respectively to the brake valve 6, the governor 2, the door valve 7, the compressor discharge 11, and the compressor intake 10. The stand pipes 16–20 extend only a short distance below the top of the solvent tank 12.

The connection to the compressor discharge 11 is through a fitting 21 extending downstream so that whenever the compressor is operating there is an aspirator action which draws solvent into the compressor discharge. The connection to the compressor intake 10 is through a valve 22 having a plunger 23 which is biased to the closed position by a spring 24 and which is lifted to the open position by the unloader lever 8. Whenever the valve 22 is open, solvent is drawn through the valve into a line 25 discharging into the compressor intake 10. Whenever the connection is made from the solvent tank to the compressor intake, it is not necessary to have the connection from the solvent tank to the compressor discharge. The solvent discharged into the compressor discharge 11 keeps the compressed air lines from the compressor to the solvent tank clean. The injection of solvent into the compressor intake 10 further cleans the compressor valve and also the compressor discharge line leading from the compressor to the reservoir and solvent tank.

When the solvent tank 12 is first filled, the first few operations of the valves 6 and 7, of the governor 2 and of the unloader lever 8, injects approximately from ¼ to ⅓ of the capacity of the solvent tank into the compressed air lines. This solvent is allowed to stand in the valves and other moving parts connected to the lines for a few minutes and then the solvent is ejected by operating the valves. The solvent standing in contact with the moving parts cleans the gum or sludge. After the liquid level in the solvent tank 12 drops below the ends of the stand pipes 16—20, each succeeding operation of the governor or of the valves 6 and 7 or the unloader lever 8 causes a vapor of solvent to be fed through the lines. The compressed air produces this vapor by bubbling through the solvent at the lower end of the stand pipe 13. This vapor continues to clean the valves or to maintain the valves in a cleaned condition.

Preferably the solvent contains a lubricant and an anti-freeze. It is, of course, desirable that the solvent be non-toxic and non-corrosive and otherwise compatible with the metal, gaskets, or diaphragms used in the working parts of the system.

When all of the solvent has been discharged from the solvent tank 12, the system operates just as though the solvent tank were not connected in the air pressure supply line. The solvent tank then merely serves as an added reservoir for the compressed air supply.

Another advantage of this system is that air leaks in the system are quickly detected by the vapor. This is an important advantage in servicing.

What I claim as new is:

1. In an air brake system or the like, an air compressor having a discharge line to a pressure reservoir, a solvent tank having an inlet line from the reservoir below the normal liquid level in the solvent tank and an outlet line from the solvent tank from above the normal liquid level in the solvent tank to the discharge line, another outlet line from the solvent tank to the point of use of the compressed air, and a connection from the first outlet line into the discharge line facing downstream as regards the direction of air flow in the discharge line so as to create suction in the outlet line.

2. In an air brake system or the like, an air compressor having an intake, a discharge line to a pressure reservoir, an unloader, and operating means for the unloader, a solvent tank having an inlet line from the reservoir below the normal liquid level in the solvent tank and an outlet line leading from above the normal liquid level in the solvent tank to the compressor intake, another outlet line from the solvent tank to the point of use of the compressed air, and a valve in the first outlet line, an operative connection to the valve controlled by the unloader operating means to open when the compressor is not unloaded.

3. In an air brake system or the like, an air compressor having an intake, a discharge, and an unloader, a solvent tank having an inlet line from the compressor discharge below the normal liquid level in the solvent tank and an outlet line leading from above the normal liquid level in the solvent tank to the compressor intake, another outlet line from the solvent tank to the point of use of the compressed air, a valve in the first outlet line, and a control including an operative connection to the valve closing and opening the valve with the unloading and loading of the compressor.

EUGENE S. BLOXSOM.

References Cited in the file of this patent

UNITED STATES PATENTS

| Number | Name | Date |
|---|---|---|
| 779,623 | Porter | Jan. 10, 1905 |
| 1,171,014 | Anger et al. | Feb. 8, 1916 |
| 1,336,905 | Hunzicker | Apr. 13, 1920 |
| 1,526,449 | Wishart | Feb. 17, 1925 |
| 1,771,315 | Remfry | July 22, 1930 |
| 1,956,640 | Danver et al. | May 1, 1934 |
| 2,172,832 | Watkins | Sept. 12, 1939 |
| 2,245,600 | Medsker | June 17, 1941 |
| 2,264,616 | Buckbee | Dec. 2, 1941 |
| 2,470,655 | Shaw | May 17, 1949 |